(12) United States Patent
Euchner

(10) Patent No.: US 7,007,164 B1
(45) Date of Patent: Feb. 28, 2006

(54) METHOD AND ARRAY FOR AUTHENTICATING A FIRST INSTANCE AND A SECOND INSTANCE

(75) Inventor: Martin Euchner, München (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/831,046

(22) PCT Filed: Oct. 11, 1999

(86) PCT No.: PCT/DE99/03262

§ 371 (c)(1),
(2), (4) Date: May 3, 2001

(87) PCT Pub. No.: WO00/27070

PCT Pub. Date: May 11, 2000

(30) Foreign Application Priority Data

Nov. 3, 1998 (DE) ................................ 198 50 665

(51) Int. Cl.
*H04L 9/00* (2006.01)
(52) U.S. Cl. ........................ 713/168; 713/169; 713/171; 380/30; 380/284; 380/285
(58) Field of Classification Search ........ 713/168–169, 713/171, 181; 380/30, 281–282, 284–285
See application file for complete search history.

(56) References Cited

U.S. PATENT DOCUMENTS

| 4,200,770 A | * | 4/1980 | Hellman et al. | ............... | 380/30 |
| 5,241,599 A | * | 8/1993 | Bellovin et al. | ............ | 713/171 |
| 5,491,749 A | * | 2/1996 | Rogaway | .................... | 713/171 |
| 6,226,383 B1 | * | 5/2001 | Jablon | ......................... | 380/30 |

FOREIGN PATENT DOCUMENTS

DE        39 15 262 A1      11/1989

OTHER PUBLICATIONS

Jablon, D., Strong Password-Only Authenticated Key Exchange, Oct. 1996, ACM Computer Communications Review, pp. 1-22.*
Menezes et al., Handbook of Applied Cryptography, 1997, CRC Press, pp. 103-113.*
Schneier, B., "Applied Crytography", 1996 John Wiley & Sons, 2nd Edition, pp. 513-514, 519-521.*
Menezes, A. et al, "Handbook of Applied Cryptography", 1997, CRC Press, pp. 359-368.*
Harn, L, "Modified key agreement protocol based on the digital signature standard", Electronics Letters, (1995) UK, vol. 31, No. 6, pp. 448-449.
Diffie W, et al, "Authentication and authenticated key exchanges", Designs, Codes and Cryptography, (1992), Netherlands, vol. 2, No. 2, pp. 107-125.
Koblitz, N. , "Elliptic curve cryptosystems" Mathematics of Computation, (1987), USA, vol. 48, No. 177, pp. 203-209.

(Continued)

*Primary Examiner*—Gilberto Barrón, Jr.
*Assistant Examiner*—Minh Dinh
(74) *Attorney, Agent, or Firm*—Laurence A. Greenberg; Werner H. Stemer; Ralph E. Locher

(57) ABSTRACT

In order to authenticate a first entity at a second entity, a first number is generated by way of an asymmetric cryptographic method. This first number is symmetrically encoded and transmitted to the second entity. The second entity checks the first number by decoding the second number and thereby authenticates the first entity.

13 Claims, 3 Drawing Sheets

OTHER PUBLICATIONS

Ruland, C., Informationssicherheit in Datennetzen [Information security in data networks], DATACOM-Verlag, Bergheim (1993), ISBN 3-89238-081-3, pp. 42-46.

Ruland, C., Informationssicherheit in Datennetzen [Information security in data networks], DATACOM-Verlag, Bergheim (1993), ISBN 3-89238-081-3, pp. 73-85.

Ruland, C., Informationssicherheit in Datennetzen [Information security in data networks], DATACOM-Verlag, Bergheim (1993), ISBN 3-89238-081-3, pp. 101-117.

NIST, FIPS Pub 180-1: Secure Hash Standard, (1995), http://csrc.nist.gov/fips/fip180-1.ps.

NIST, FIPS Pub 81: DES Modes of Operation, (1980), http://www.itl.nist.gov/div897/pubs/fip81.htm.

Menezes, A. et al., Handbook of Applied Cryptography; CRC Press (1996), ISBN 0-8493-8523-7; chapter 12.6, pp. 515-524.

* cited by examiner

US 7,007,164 B1

METHOD AND ARRAY FOR AUTHENTICATING A FIRST INSTANCE AND A SECOND INSTANCE

BACKGROUND OF THE INVENTION

1. Field of the Invention

The invention relates to a method and an arrangement for authenticating a first entity with a second entity and/or vice versa.

2. Description of the Related Art

During an authentication, a first entity declares to a second entity reliably that it actually is the first entity. There is a corresponding need in the transmission of (confidential) data to ensure from whom the data actually originate.

A symmetrical encoding method is known from Christoph Ruland: Informationssicherheit in Datennetzen [Information security in data networks], DATACOM-Verlag, Bergheim 1993, ISBN 3-89238-081-3, (Ruland), pages 42–46. In the symmetric encoding method, a key is used both for the encoding and for the decoding. An attacker who comes into possession of such a key can transform a plain text (the information to be encoded) into encoded text, and vice versa. The symmetrical encoding method is also called private key method or method with a secret key. A known algorithm for symmetrical encoding is the DES (data encryption standard) algorithm. It was standardized in 1974 under ANSI X3.92-1981.

An asymmetrical encoding method is known from Ruland, pages 73–85. In this case, a subscriber is not assigned a single key, but a key system composed of two keys: one key maps the plain text into a transformed one, while the other key permits the inverse operation and converts the transformed text into plain text. Such a method is termed asymmetric because the two parties participating in a cryptographic operation use different keys (of a key system). One of the two keys, for example a key p, can be made publicly known, if the following properties are fulfilled:

It is not possible to derive from the key p with a justifiable outlay; a secret key s required for the inverse operation.

Even if plain text is transformed with the (public) key p, it is not possible to derive the (secret) key s from it.

For this reason, the asymmetric encoding method is also termed a public key method with a key p which can be made known publicly.

It is possible in principle to derive the secret key s from the public key p. However, this becomes arbitrarily complicated by virtue of the fact, in particular, that algorithms are selected which are based on problems in complexity theory. These algorithms are also spoken of as "one-way trapdoor" functions. A known representative for an asymmetric encoding method is the Diffie-Hellman method A. Menezes, P. v. Oorschot, S. Vanstone: Handbook of Applied Cryptography; CRC Press 1996, ISBN 0-8493-8523-7; chapter 12.6 (pp. 515–524) (Menezes). This method can be used, in particular, for key exchange (Diffie-Hellman key agreement, exponential key exchange).

The term encoding implies the general application of a cryptographic method $V(x,k)$, in which a prescribed input value x (also termed plain text) is converted by means of a secret k (key) into an encoded text $c:=V(x,k)$. The plain text x can be reconstructed using knowledge of c and k by means of an inverse decoding method. The term encoding is also understood as "one-way encoding" with the property that there is no inverse, efficiently calculable decoding method. Examples of such a one-way encoding method are a cryptographic one-way function or a cryptographic hash function, for example the algorithm SHA-1, see NIST, FIPS PUB 180-1: Secure Hash Standard, April 1995, available on-line at hftp://csrc.nist.gov/fips/fip 180-1.ps.

There is a problem in practice of ensuring that a public key which is used to verify an electronic signature really is the public key of the person who is assumed to be the originator of the transmitted data (ensuring the authenticity of the originator). The public key therefore need not be kept secret, but it must be authentic. There are known mechanisms (see Ruland at pages 101–117) which ensure with a high outlay that the authenticity is reliable. Such a mechanism is the setting up of a trust center, which enjoys trustworthiness and with the aid of which general authenticity is ensured. The setting up of such a trust center, and the exchange of the keys from this trust center are, however, very complicated. For example, it must be ensured during the key allocation that it really is the addressee and not a potential attacker who receives the key or the keys. The costs for setting up and operating the trust center are correspondingly high.

SUMMARY OF THE INVENTION

It is the object of the invention to ensure authentication without needing to invest in a separate outlay for a certification entity or a trust center.

This object is achieved according to the discussion below.

The inventive method for authenticating a first entity with a second entity is provided in which the first entity carries out an operation $A(x,g)$ on a (publicly) prescribed known value g and on a value x known only to the first entity. The result of the first operation is encoded with the aid of a first key, which is known to the first and second entities. The result of the first operation, encoded by way of the first key, is transmitted by the first entity to the second entity.

It is particularly advantageous in this case to use a symmetrical method in order to authenticate one entity in the eyes of a further entity. This authentication is effected without setting up a separate certification entity or a trust center.

One refinement consists in that the first operation $A(x,g)$ is an asymmetric cryptographic method. In particular, the first operation can be carried out on an arbitrary finite and cyclic group G.

A further refinement consists in that the first operation $A(x,g)$ is a Diffie-Hellman function $G(gx)$. Alternatively, the first operation can also be an RSA function xg.

A development consists in that the group G is one of the following groups:

a) a multiplicative group $F_q^*$ of a finite body $F_q$, in particular having
   a multiplicative group $Z_p^*$ of the integers modulo of a prescribed prime number p;
   a multiplicative group $F_t^*$ with t=2m over a finite body $F_t$ of characteristic 2; and b) a group of units $Z_n^*$ with n as a composite integer;

c) a group of points on an elliptic curve over a finite body; and d) a Jacobi variant of a hyperelliptic curve over a finite body.

A further development consists in that the result of the first operation is a second key with which the first entity is authorized to undertake a service on the second entity.

An additional refinement consists in that the second key is a session key or an authorization associated with an application.

It also is a development for the second key to be determined in relation to

G (gxy), by virtue of the fact that the second entity carries out an operation G(gy) with a secret number y known only to it. The result of this second operation is encoded with the first key and transmitted to the first entity.

An additional development consists in that the Diffie-Hellman method is used to generate the second key.

Another refinement consists in that the encoding is carried out with the first key with the aid of a one-way function, in particular a cryptographic one-way function. A one-way function is distinguished in that it is easy to calculate in one direction, but its inversion can be performed only with so large an outlay that it is impractical. An example of such a one-way function is a cryptographic hash function which generates an output B from an input A. The output B cannot be used to infer the input A, even when the algorithm of the hash function is known.

Another development is that the encoding which is carried out with the first key corresponds to a symmetrical encoding method.

A final development is that the transmitted data are confidential data.

Furthermore, to achieve the object, an authenticating arrangement is specified in which a processor unit is provided which is set up in such a way that a) a first entity can carry out a first operation A(x,g) on a prescribed known value g and on a value x known only to the first entity;

b) the result of the first operation can be encoded with the aid of a first key known to the first and to a second entity;

c) the result of the first operation encoded with the first key can be transmitted by the first entity to the second entity; and d) the result of the first operation is decoded by the second entity with the first key, and the first entity can thereby be authenticated.

This arrangement is particularly suitable for carrying out the method according to the invention or one of its developments explained above.

BRIEF DESCRIPTION OF THE DRAWINGS

Exemplary embodiments of the invention are illustrated and explained below with the aid of the drawings.

DETAILED DESCRIPTION OF THE INVENTION

Figure 1:
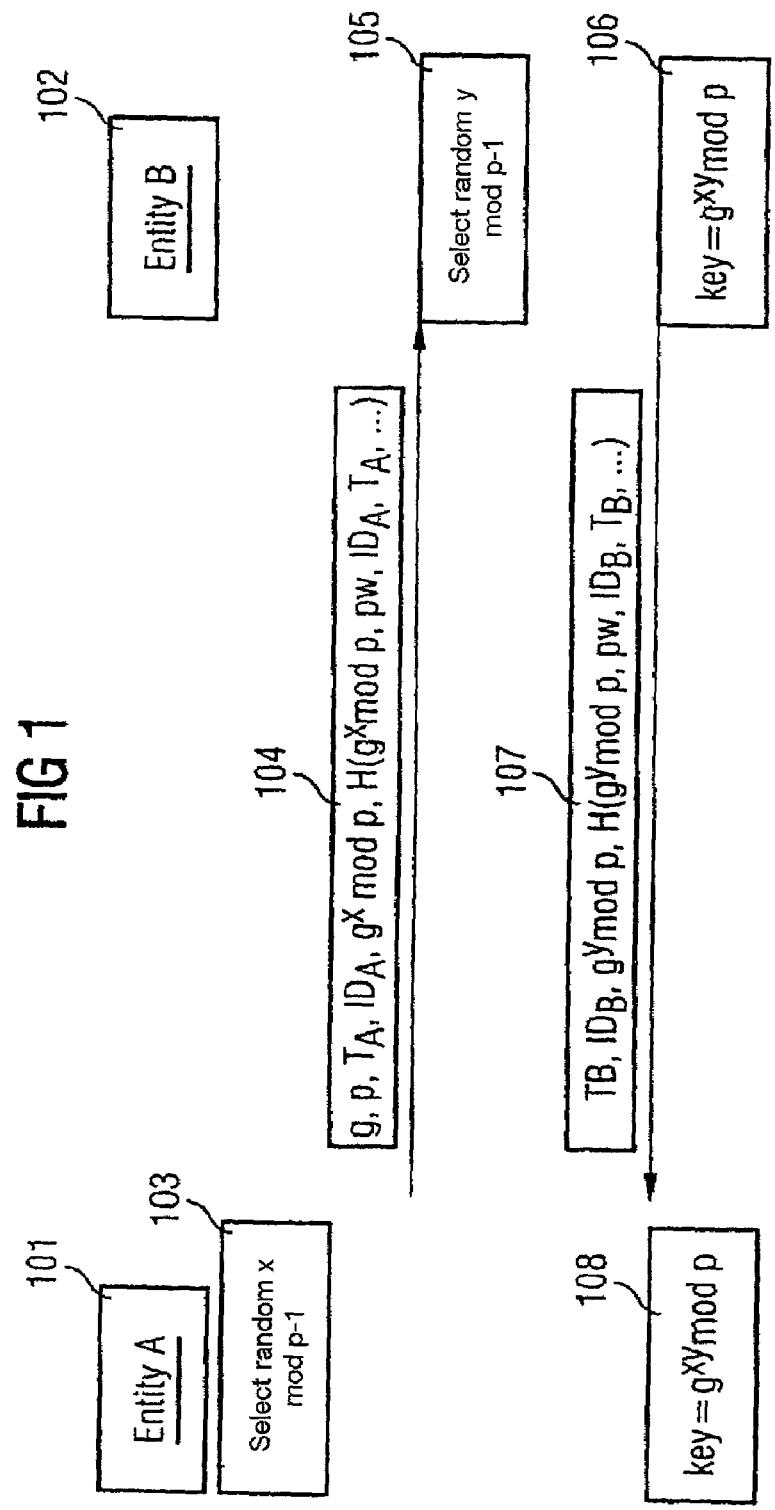
FIG. 1 is a block diagram relating to the agreement of a common key between two entities whose respective authenticity is ensured in each case.

FIG. 1 is a diagram relating to the agreement of a common key between two entities whose respective authenticity is ensured in each case. An entity A 101 selects a random number x in a body "mod p−1" (see block 103). The entity 101 now sends an entity 102 a message 104 which has the following format:

g, p, $T_A$ $ID_A$, $g^x$ mod p, H($g^x$ mod p, pw, $ID_A$, $T_A$, . . .

where x denotes a secret random value of the entity A 101, y denotes a secret random value of the entity B 102, g denotes a generator according to the Diffie-Hellman method, p denotes a prime number for the Diffie-Hellman method, $T_A$ denotes a time stamp of the entity A during generation and/or transmission of the message, $T_B$ denotes a time stamp of the entity B during generation and/or transmission of the message, $ID_A$ denotes an identification feature of the entity A, $ID_B$ denotes an identification feature of the entity B, $g^x$ mod p denotes a public Diffie-Helman key of the entity A, $g^y$ mod p denotes a public Diffie-Hellman key of the entity B, pw denotes a shared secret between the entities A and B (password "shared secret"), H(M) denotes a cryptographic one-way function (hash function) over the parameters M, and key denotes a session key common to the two entities A and B.

If this message has arrived at the entity 102, a random number y is selected there (see block 105) from the body "mod p−1" and a common key is agreed to in a block 106 as key=$g^{xy}$ mod p.

The second entity 102 transmits a message 107 with the format

TB, $ID_B$, $g^y$ mod p, H($g^y$ mod p, pw, $ID_B$, $T_B$, . . . )

to the first entity 101. The first entity 101 will then carry out the operation key=$g^{xy}$ mod p in a step 108, this likewise yielding the common key "key".

In this case, for example, the body "mod p−1" has been selected as one of many possibilities. Furthermore, the messages 104 and 107 are regarded in each case as one possibility of many. In particular, the fields for addressing within the messages depend on the application and/or the transmission protocol used.

Figure 2:
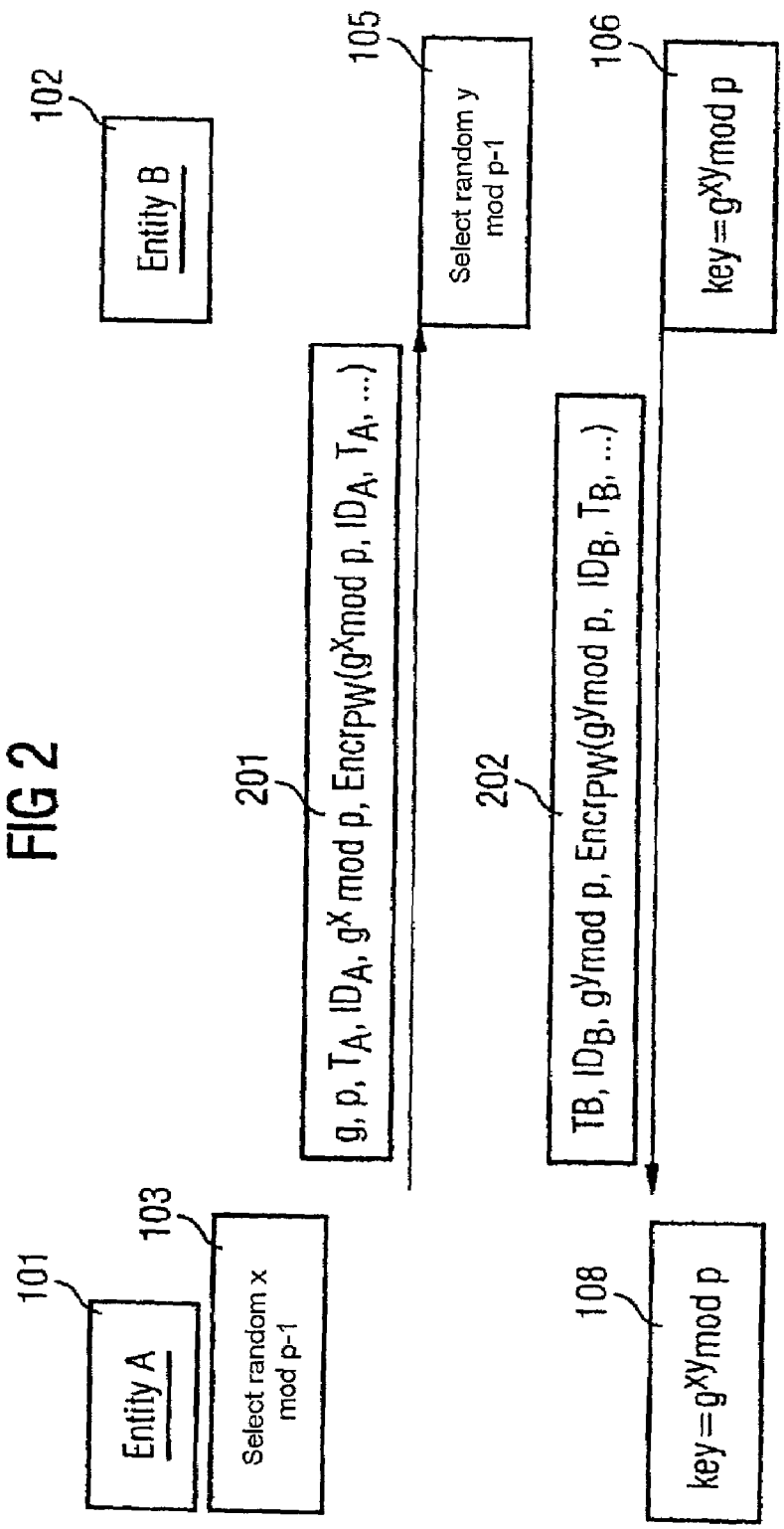
FIG. 2 is a block diagram in accordance with FIG. 1 and using the DES algorithm.

A cryptographic one-way hash function H is used in FIG. 1. An example for transmitting such a one-way hash function is the SHA-1 algorithm (compare NIST, FIPS PUB 180-1: Secure Hash Standard, April 1995; available on-line at http://csrc.nist.gov/fips/fip180-1.ps). The use of a symmetrical encoding method, for example the DES algorithm NIST, FIPS PUB 81: DES Modes of Operation, December 1980; available on-line at http://www.itl.nist.gov/div897/pubs/fip81.htm, instead of the one-way hash function H, is illustrated in FIG. 2. The blocks 101, 102, 103, 105, 106 and 108 are identical in FIG. 2 to FIG. 1. The message 201 transmitted by the first entity 101 to the second entity 102 has the format g, p, $T_A$, $ID_A$, $g^x$ mod p, Encr$_{PW}$($g^x$ mod p, pw, $ID_A$, $T_A$, . . . ), where Encr$_{PW}$(M) denotes a symmetrical method for encoding the parameter M with the key PW.

In the reverse direction, the entity 102 sends the entity 101 in FIG. 2 the message 202 which has the following format:

TB, $ID_B$, $g^y$ mod p, Encr$_{PW}$($g^y$ mod p, PW, IDB, TB, . . . ).

In each case, one message (the message 104 in FIG. 1, and the message 201 in FIG. 2) suffices in order to authenticate the first entity 101 with respect to the second entity 102. Disregarding the fact that the second entity 102, for example, a service to be undertaken within a network connection (for example the Internet) must also be authenticated, it can suffice if only the first entity 101 is authenticated. This already derives after transmission of the respective first messages 104 and 201. If, in particular, the first entity 101 dials in at the second entity 102, it is frequently to be assumed that this second entity 102 is also the correct entity. Conversely, the second entity 102 must be able to assume that the caller (the first entity 101) is also the one for which it is outputting. Checking authenticity is therefore important in this direction, from the first entity 101 to the second entity 102.

Figure 3:
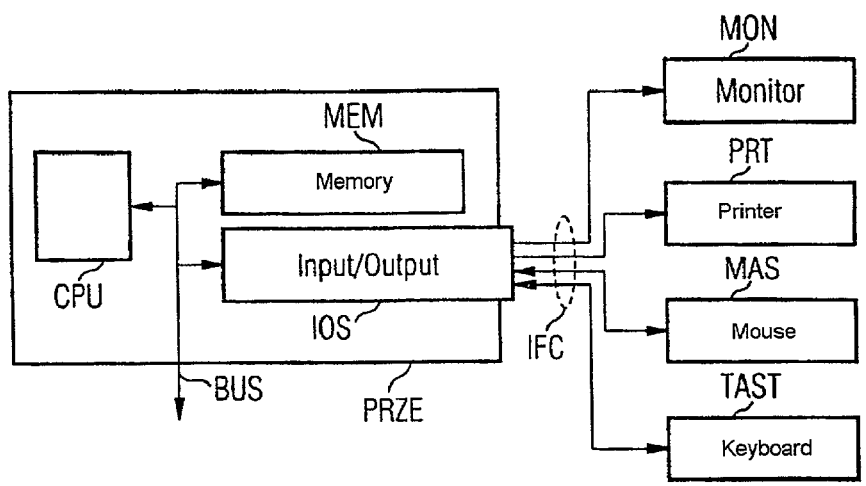
FIG. 3 is a block diagram of a processor unit.

FIG. 3 illustrates a processor unit PRZE. The processor unit PRZE comprises a processor CPU, a memory SPE and an input/output interface IOS which are used in various ways via an interface IFC. Via a graphics interface, an output is visualized on a monitor MON and/or output on a printer PRT. An input is performed via a mouse MAS or a keyboard TAST. The processor unit PRZE also has a data bus BUS, which ensures the connection of a memory MEM, the processor CPU, and the input/output interface IOS. Furthermore, additional components, for example, additional memory, data memory (hard disk) or scanner, can be connected to the data bus BUS.

The above-described method and arrangement are illustrative of the principles of the present invention. Numerous modifications and adaptations will be readily apparent to those skilled in this art without departing from the spirit and scope of the present invention.

What is claimed is:

1. An authenticating method, comprising the steps of:
   a) performing a first operation by a first entity on a prescribed known value and on a value only known to the first entity to obtain an uncoded result of the first operation;
   b) encoding the result of the first operation with a first key known to the first entity and to a second entity to obtain an encoded result of the first operation, the encoding performed with the first key utilizing a symmetric encoding method;
   c) transferring a message from the first entity to the second entity, wherein the message comprises the encoded result of the first operation as well as the uncoded result of the first operation; and
   d) decoding the encoded result of the first operation by the second entity with the first key and authenticating the first entity only using the message.

2. The method according to claim 1, wherein the first operation
   a) is a Diffie-Hellman function $G(g^x)$, wherein $G(\ )$ is an arbitrary, finite cyclic group G; or
   b) is an RSA function $x^g$.

3. The method according to claim 1, wherein said first operation is performed on a group G, wherein the group G is one of the following groups:
   a) a multiplicative group $F_q^*$ of a finite body $F_q$, in particular having
      a multiplicative group $Z_p^*$ of the integers modulo of a prescribed prime number p;
      a multiplicative group $F_t^*$ with $t=2^n$ over a finite body $F_t$ of characteristic 2;
   b) a group of units $Z_n^*$ with n as a composite integer;
   c) a group of points on an elliptic curve over a finite body; or
   d) a Jacobi variant of a hyperelliptic curve over a finite body.

4. The method according to claim 1, wherein the encoding is performed with the first key utilizing a one-way function, in particular a cryptographic one-way function.

5. The method according to claim 1, wherein the prescribed known value and the value only known to the first entity are confidential data.

6. The method according to claim 1, wherein the first operation is an asymmetric crypto process.

7. The method according to claim 1, wherein the result of the first operation is a second key with which the first entity is authorized to undertake a service on the second entity.

8. The method according to claim 7, wherein the second key is a session key or an authorization associated with an application.

9. The method according to claim 7, wherein the Diffie-Hellman method is used to produce the second key.

10. The method according to claim 7, wherein the second key is determined in relation to $G(g^{xy})$, by virtue of the fact that the second entity performs a second operation $G(g^y)$ with a secret number y known to only it, the result of this second operation is encoded with the first key and transmitted to the first entity in the form of a message.

11. The method according to claim 10, wherein the message also comprises the result of this second operation, an identification or a time stamp in an uncoded form.

12. The method according to claim 1, wherein the message further comprises an identification of an entity or a time stamp in both an uncoded form and in an encoded form.

13. An authenticating system, comprising:
    a first entity and a second entity, the entities being provided with a processor unit, wherein,
    a) said first entity being configured to perform a first operation on a prescribed known value and on a value known only to said first entity to obtain a result of the first operation;
    b) said first entity being configured to encode the result of the first operation with a first key known to said first entity and to said second entity to obtain an encoded result of the first operation, the encoding performed with the first key utilizing a symmetric encoding method;
    c) said first entity being configured to transfer a message from said first entity to said second entity, wherein said message contains the encoded result of the first operation and the uncoded result of the first operation; and
    d) said second entity being configured to decode the encoded result of the first operation with the first key and said second entity additionally being configured to authenticate said first entity only using said message.

* * * * *